United States Patent
Yu et al.

(10) Patent No.: US 11,581,604 B2
(45) Date of Patent: Feb. 14, 2023

(54) SIDE PLATE AND BATTERY MODULE

(71) Applicant: CONTEMPORARY AMPEREX TECHNOLOGY CO., LIMITED, Ningde (CN)

(72) Inventors: Kaiqin Yu, Ningde (CN); Jihua Yao, Ningde (CN); Yanhuo Xiang, Ningde (CN); Mu Qian, Ningde (CN); Guangliang Lin, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 353 days.

(21) Appl. No.: 16/548,984

(22) Filed: Aug. 23, 2019

(65) Prior Publication Data
US 2020/0161606 A1 May 21, 2020

(30) Foreign Application Priority Data
Nov. 15, 2018 (CN) .......................... 201821884525.6

(51) Int. Cl.
*H01M 2/10* (2006.01)
*H01M 50/20* (2021.01)

(52) U.S. Cl.
CPC .................................. *H01M 50/20* (2021.01)

(58) Field of Classification Search
CPC .............. H01M 50/20–147; H01M 10/62–658
See application file for complete search history.

(56) References Cited

U.S. PATENT DOCUMENTS

| | | | |
|---|---|---|---|
| 2006/0093899 A1* | 5/2006 | Jeon ...................... | H01M 50/20 429/153 |
| 2010/0248008 A1* | 9/2010 | Sugawara ........... | H01M 50/502 429/159 |
| 2018/0183025 A1 | 6/2018 | Cao et al. | |
| 2018/0287116 A1* | 10/2018 | Seo ...................... | H01M 50/147 |
| 2019/0006643 A1* | 1/2019 | Sakurai ............... | H01M 10/658 |

FOREIGN PATENT DOCUMENTS

| | | |
|---|---|---|
| CN | 103299451 A | 9/2013 |
| CN | 107851759 A | 3/2018 |
| CN | 207441760 U | 6/2018 |

OTHER PUBLICATIONS

Extended European Search Report for European Patent Application No. 19193253.2 dated Feb. 28, 2020.

\* cited by examiner

*Primary Examiner* — Osei K Amponsah
(74) *Attorney, Agent, or Firm* — Anova Law Group, PLLC (57) ABSTRACT

The present disclosure provides a side plate and a battery module. The side plate is applied to the battery module. The side plate includes: a first plate, a second plate and a connection portion. The first plate includes a first free end at one side in a height direction, the second plate includes a second free end at the same side in the height direction, the first free end and the second free end abut against each other. The connection portion is located at the other side opposite to the first free end and the second free end in the height direction, and is configured to connect the first plate and the second plate, and enclose a hollow cavity with the first plate and the second plate.

17 Claims, 6 Drawing Sheets

SIDE PLATE AND BATTERY MODULE

CROSS-REFERENCE TO RELATED APPLICATION

This application claims the priority benefit of Chinese Utility model application No. 201821884525.6 filed on Nov. 15, 2018 and entitled "SIDE PLATE AND BATTERY MODULE", the disclosure of which is incorporated by reference herein in its entirety.

TECHNICAL FIELD

The present disclosure relates to the battery field, especially to a side plate and a battery module.

BACKGROUND

Compared with a hard-pack battery, a soft-pack battery does not have an outer aluminum case and the battery is free to expand, and thus swelling of the battery during a cyclic process is larger, and a swelling force is correspondingly larger.

SUMMARY

In one aspect, the present disclosure provides a side plate for a battery module, including: a first plate including a first free end at one side in a height direction; a second plate opposite to the first plate in a width direction, the second plate including a second free end at the one side in the height direction, and the first free end and the second free end abutting against each other; and a connection portion, located at the other side opposite to the first free end and the second free end in the height direction, connecting the first plate and the second plate, and enclosing a hollow cavity with the first plate and the second plate.

In some embodiments, the first plate and the second plate overlap and abut against each other at the first free end and the second free end respectively.

In one embodiment, the first plate has a first curved segment formed at the first free end, and the first curved segment is configured to bend inwards and extend into the cavity, and overlap an inner surface of the second plate at the second free end; or the second plate has a second curved segment formed at the second free end, and the second curved segment is configured to bend inward and extend into the cavity, and overlap an inner surface of the first plate at the first free end.

In some embodiments, the first plate has a first curved segment formed at the first free end, and the first curved segment is configured to bend inwards and extend into the cavity; the second plate has a second curved segment formed at the second free end, and the second curved segment is configured to bend inward and extend into the cavity; a side surface of the first curved segment in the width direction is configured to overlap a side surface of the second curved segment in the width direction.

In some embodiments, the first plate and the second plate are configured to butt and abut against each other at the first free end and the second free end respectively.

In some embodiments, the side plate further includes: a side support being connected to at least one side of the second plate in a length direction and configured to bend inwards and extend into the cavity, such that a side surface of the side support in the width direction abuts against an inner surface of the first plate.

In some embodiments, the first plate has a step-shaped segment concaved into the cavity in the width direction at least at one side in the height direction.

In some embodiments, the side plate further includes: two extension portions, connecting to two ends of the first plate in the length direction and extending outwards in the length direction respectively.

In some embodiments, the side plate is an integrally formed structure.

In another aspect, the present disclosure provides a battery module, including: a first side plate; a second side plate, disposed opposite to the first side plate in the width direction; a top plate and a bottom plate, respectively secured to a side of the first side plate and a side of the second side plate in the height direction, and enclosing an accommodating space with the first side plate and the second side plate; a plurality of battery units, accommodated in the accommodating space and sandwiched between the first side plate and the second side plate in the width direction, and at least one of the first side plate and the second side plate being of a side plate according to the present disclosure, and the second plate of the side plate facing the accommodating space.

The hollow cavity of the side plate may provide an accommodating space for the swelling of a battery unit and reduces deformation of the battery module. Besides, the battery module uses such a first side plate, a second side plate, a top plate and a bottom plate formed separately to form an outer frame, which effectively prevents a pouch-type secondary battery from being scratched when the battery module is being assembled.

Reference signs are presented as follows:
1 first side plate
2 second side plate
3 side plate
  31 first plate
    311 first free end
      B1 first curved segment
    312 step-shaped segment
  32 second plate
    321 second free end
      B2 second curved segment
  33 connection portion 34 cavity
35 side support
36 extension portion
4 top plate
   41 body portion
   42 top plate side
5 bottom plate
   51 body portion
   52 bottom plate side
6 battery unit
   61 holder
   62 pouch-type secondary cell
      621 electrode terminal
7 conductive connecting pad
8 elastic cushion
9 end plate
L length direction
H height direction
W width direction

DETAILED DESCRIPTION

The drawings show some embodiments of the present disclosure. It shall be appreciated that the embodiments disclosed herein are merely examples of the present disclosure which may be implemented in various manners. Therefore, specific details disclosed in the present disclosure shall not be interpreted as limiting, but as a basis of the claims and as a representative basis for teaching those skilled in the art to implement the present disclosure in various manners.

Besides, such description on a length direction, a width direction and a height direction as indicating a direction of operation and configuration of a component of a side plate and a battery module in an embodiment is not an absolute but relative description. Further, though the directions are appropriate when the respective components of the side plate and battery module are at positions shown in the drawings, the dimensions shall be interpreted differently when these positions change, so as to correspond to the changes.

The inventors find that during the invention process that: the swelling force of a soft-pack battery module may cause swelling and deformation or damage to a structure of the battery module, it is necessary to strengthen rigidity of the battery module in a width direction, which is generally performed in the following methods.

One, the soft-pack battery is disposed with a rigid metal plate on a large-area surface. The battery is compressed by two metal plates and is locked by using a long bolt. In this way, battery module deformation caused by the swelling force may be alleviated to some extent. However, the long bolt may only be locked tight at both head and end sides of the battery module, but strength in the middle is still weak, and the problem of deformation can not be solved when a larger swelling force is applied.

Second, the outer frame for the battery module is pre-processed and is in a square-looped shape by using an integral outer frame design, and the soft-pack battery may be put into the battery module's outer frame after assembling. In this way, the rigidity of the outer frame is high, which is favorable for reducing swelling and deformation of the battery. However, since the outer frame is preformed, there is no operation space in the assembling process, and an assembling clearance can be formed only by deformation of cushioning foam between batteries, the operation is complicated, and it is easy to scratch the surface of the battery, which is highly risky.

In view of the technical problem above, the inventors provide a a side plate and a battery module. In some embodiments, the side plate may accommodate swelling of a pouch-type secondary cell when being applied to the battery module, thereby reducing deformation of the battery module and preventing the pouch-type secondary cell from being scratched when assembling the battery module.

Figure 1:
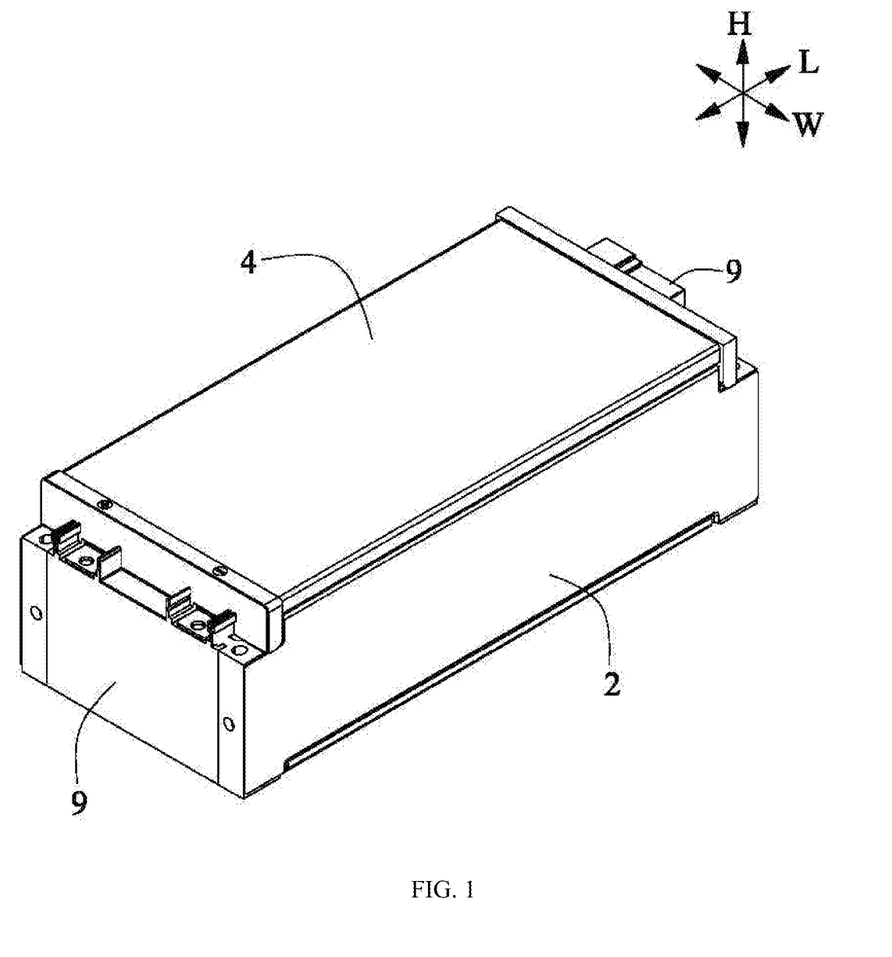
FIG. 1 is an assembled view of a battery module in accordance with the present disclosure.
Figure 2:
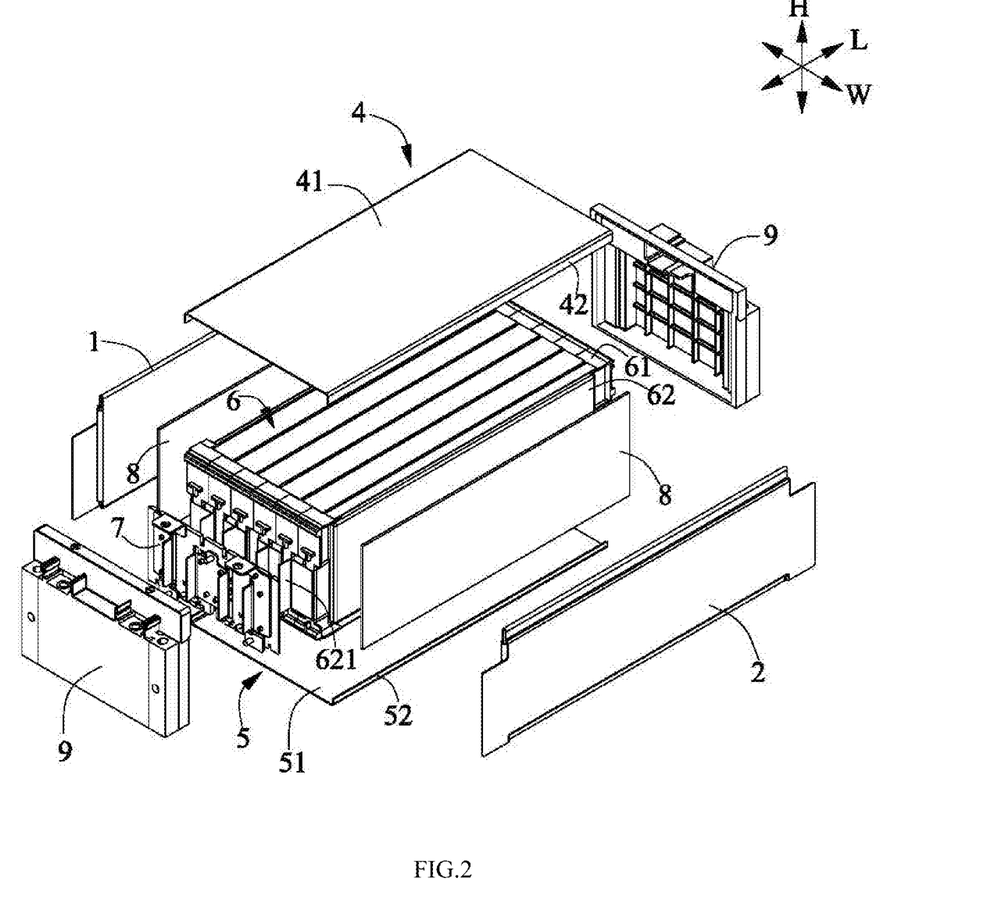
FIG. 2 is an exploded perspective view of FIG. 1.
Figure 3:
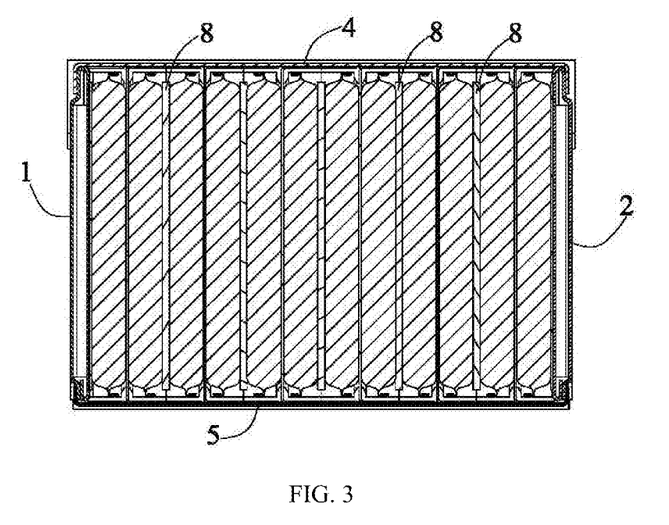
FIG. 3 is a cross-sectional view of FIG. 1.

With reference to FIG. 1 to FIG. 3, a battery module includes: a first side plate 1, a second side plate 2, a top plate 4, a bottom plate 5, a plurality of battery units 6 and end plates 9. The first side plate 1 and the second side plate 2 are disposed opposite each other in the width direction W. The top plate 4 is fixed to the first side plate 1 and the second side plate 2 at one side in the height direction H, the bottom plate 5 is fixed to the first side plate 1 and the second side plate 2 at the other side in the height direction H. The top plate 4, the bottom plate 5, the first side plate 1 and the second side plate 2 form an accommodating space. The plurality of battery units 6 are accommodated in the accommodating space and sandwiched between the first side plate 1 and the second side plate 2 in the width direction W. One end plate 9 is fixed to the first side plate 1 and the second side plate 2 at one side in the length direction L, the other end plate 9 is fixed to the first side plate 1 and the second side plate 2 at the other side in a length direction L, to enclose the accommodating space. Specifically, at least one of the first side plate 1 and the second side plate 2 adopts a side plate 3 in accordance with the following text. In some embodiments, both the first side plate 1 and the second side plate 2 adopt the side plate 3 to assemble the battery module. Herein, it shall be understood that, the width direction W refers to the width direction of the first side plate 1 and/or the second side plate 2, the width direction W may also refers to the width direction of the battery module and/or battery unit. Similarly, the length direction L refers to the length direction of the first side plate 1 and/or the second side plate 2, the length direction W may also refers to the length direction of the battery module and/or battery unit. The height direction L refers to the height direction of the first side plate 1 and/or the second side plate 2, the height direction W may also refers to the length direction of the battery module and/or battery unit.

The side plate 3 includes: a first plate 31, a second plate 32, a connection portion 33 and a cavity 34. The side plate 3 further includes: a side support 35 and an extension portion 36.

The first plate 31 includes a first free end 311 at one side in the height direction H. The first plate 31 has a step-shaped segment 312 at least at one side in the height direction H, the step-shaped segment/segments 312 is concaved into the cavity 34 in the width direction W. In some embodiments, the first plate 31 has two step-shaped segments 312 at two sides in the height direction H respectively; each step-shaped segment is concaved into the cavity 34 in the width direction W. The second plate 32 is opposite the first plate 31 in the width direction W. The second plate 32 includes a second free end 321 at the same one side in the height direction H. The first free end 311 and the second free end 321 abut against each other.

The first free end 311 and the second free end 321 abut against each other, which enables the side plate 3 to form the enclosed cavity 34 on a cross section in the height direction H and the width direction W, so as to ensure strength of the side plate 3 and improve anti-extrusion strength of the side plate 3 when the side plate 3 is subject to a swelling force.

The first free end 311 and the second free end 321 may abut against each other in various ways. In some embodiments, the first plate 31 and the second plate 32 overlap and abut against each other at the first free end 311 and the second free end 321.

Figure 7:
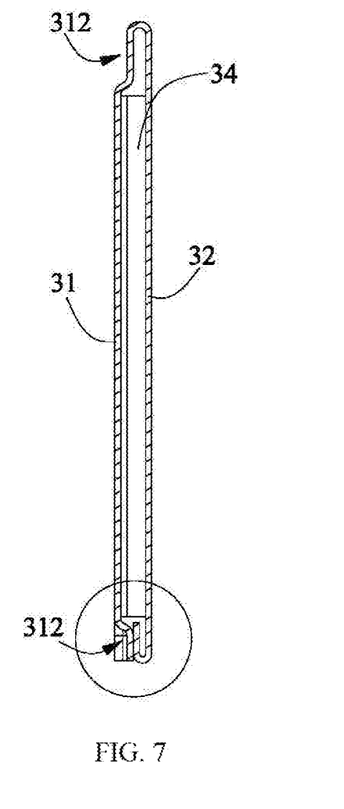
FIG. 7 is a cross-sectional view of the embodiment of FIG. 5.
Figure 8:
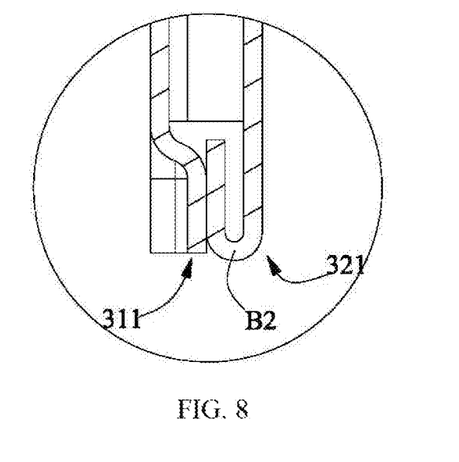
FIG. 8 is a partial zoomed-in view of FIG. 7.
Figure 9:
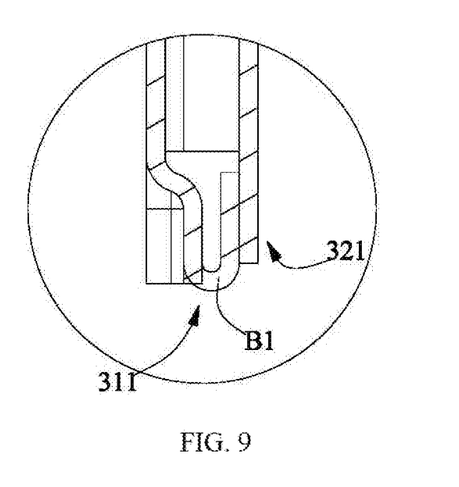
FIG. 9 is a cross-sectional view of another embodiment of a side plate similar to FIG. 8.
Figure 10:
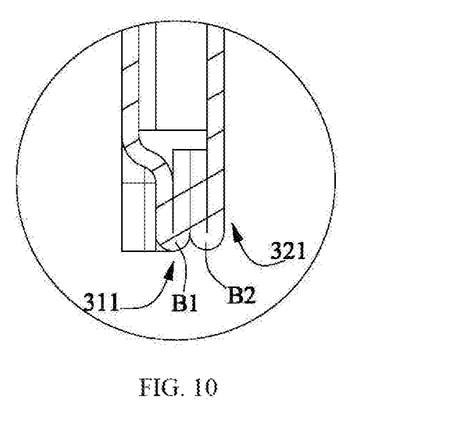
FIG. 10 is a cross-sectional view of another embodiment of a side plate similar to FIG. 8.
Figure 11:
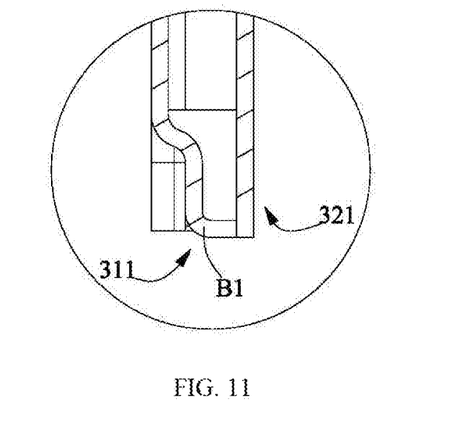
FIG. 11 is a cross-sectional view of another embodiment of a side plate similar to FIG. 8.
Figure 12:
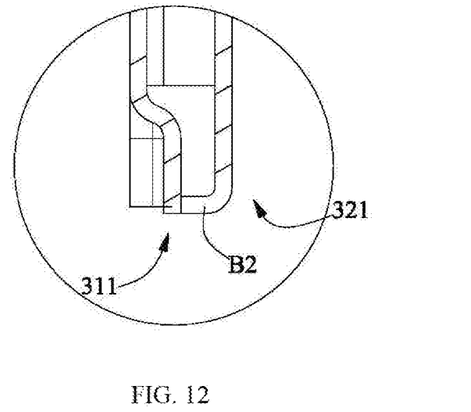
FIG. 12 is a cross-sectional view of another embodiment of a side plate similar to FIG. 8.

When the first plate 31 and the second plate 32 overlap and abut against each other at the first free end 311 and the second free end 321, there may be various overlapping ways. For example, as shown in FIG. 9, the first plate 31 has a first curved segment B1 formed at the first free end 311, and the first curved segment B1 bends inwards and extends into the cavity, and overlaps an inner surface of the second plate 32 at the second free end 321. It shall be noted that the first curved segment B1 formed by being bent does not attach to a side of the first plate 31, the side facing the cavity 34, in the width direction W, but is spaced from the side of the first plate 31, the side facing the cavity 34 in the width direction W. As shown in FIG. 7 and FIG. 8, the second plate 32 has a second curved segment B2 formed at the second free end 321, and the second curved segment B2 bends inwards and extends into the cavity, and overlaps an inner surface of the first plate 31 at the first free end 311. Similarly, the second curved segment B2 does not attach to a side of the second plate 32, the side facing the cavity 34, in the width direction W, but is spaced from the side of the second plate 32, the side facing the cavity 34 in the width direction W. As shown in FIG. 10, the first plate 31 forms a first curved segment B1 at the first free end 311, and the first curved segment B1 bends inward and extends into the cavity 34; the second plate 32 forms a second curved segment B2 at the second free end 321, and the second curved segment B2 bends inward and extends into the cavity 34; and a side of the first curved segment B1 in the width direction W overlaps a side of the second curved segment B2 in the width direction W. As shown in FIG. 11, the first plate 31 has a first curved segment B1 formed at the first free end 311, the first curved segment B1 bends and extends towards the second plate 32 in the width direction W, and an end edge of the first curved segment B1 abuts against the second plate 32 at the second free end 321. As shown in FIG. 12, the second plate 32 has a second curved segment B2 formed at the second free end 321, the second curved segment B2 bends and extends towards the first plate 31 in the width direction W, and an end edge of the second curved segment B2 abuts against the first plate 31 at the first free end 311.

Figure 13:
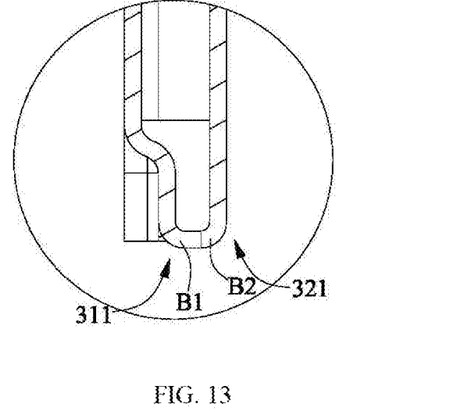
FIG. 13 is a cross-sectional view of another embodiment of a side plate similar to FIG. 8.

In some embodiments, the first plate 31 and the second plate 32 butt (i.e., edge-to-edge joint) and abut against each other at the first free end 311 and the second free end 321. In this embodiment, specifically, as shown in FIG. 13, the first plate 31 has a first curved segment B1 formed at the first free end 311, and the first curved segment B1 bends towards the second plate 32 in the width direction W; the second plate 32 has a second curved segment B2 formed at the second free end 321, and the second curved segment B2 bends towards the first plate 31 in the width direction W. An end edge of the first curved segment B1 and an end edge of the second curved segment B2 butt and abut against each other. Certainly, the way in which the first plate 31 and the second plate 32 abut against each other at the first free end 311 and the second free end 321 is not limited to the above-described embodiments, but there may be other manners.

Figure 5:
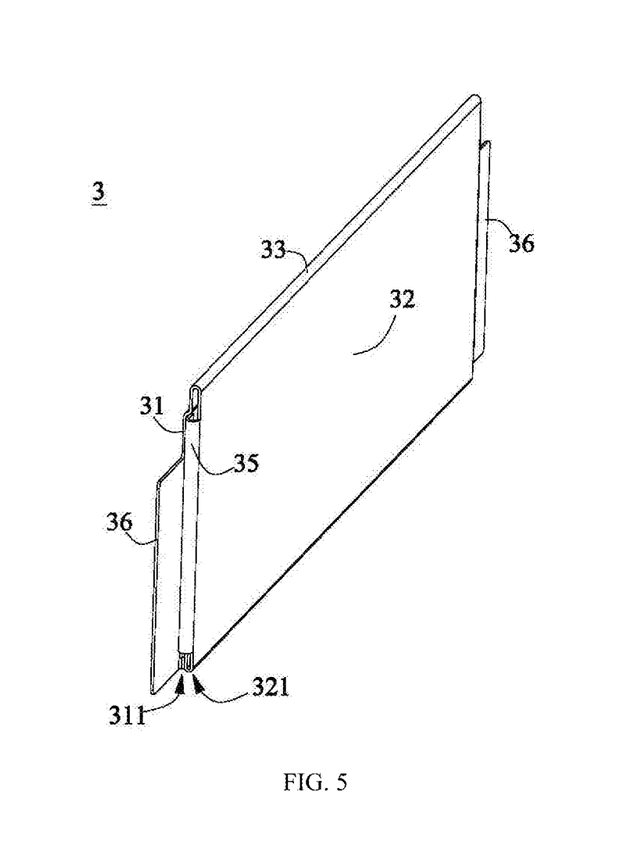
FIG. 5 is a perspective view of an embodiment of a side plate in accordance with the present disclosure.

As shown in FIG. 5 and FIG. 7, a connection portion 33 is located at a side opposite the first free end 311 and the second free end 321 in the height direction H, and the connection portion 33 connects the first plate 31 and the second plate 32, and encloses a hollow cavity 34 together with the first plate 31 and the second plate 32. With reference to FIG. 7, a cross section of the cavity 34 has a larger size in the height direction H than that in the width direction W. That is, the cavity 34 is of a flat shape, so that requirements on the size of the side plate 3 of the battery module may be satisfied.

When the above described side plate 3 is applied as the first side plate 1 and/or the second side plate 2 of a battery module for assembling, the hollow cavity 34 of the side plate 3 may provide a space for the swelling of a battery unit 6, which thus reduces deformation of the battery module, particularly reduces deformation of outer surfaces of the battery module.

As shown in FIG. 5, the side support 35 is connected to the second plate 32 at least at one side of the second plate 32 in a length direction L, and bends inwards and extending into the cavity 34 to make a side of the side support 35 in the width direction W abut against the inner surface of the first plate 31. The configuration of the side support 35 improves strength of the side plate 3 in the width direction W, and extrusion deformation degree of the side plate 3 (i.e., an inner surface and the outer surface of the side plate) may be decreased when the battery unit 6 swells and deforms.

Each end of the first plate 31 is disposed with an extension portion 36 in the length direction L, and the extension portion 36 extends outwards in the length direction L. The extension portions 36 of the corresponding side plate 3 are welded and secured to end plates 9 respectively.

Figure 6:
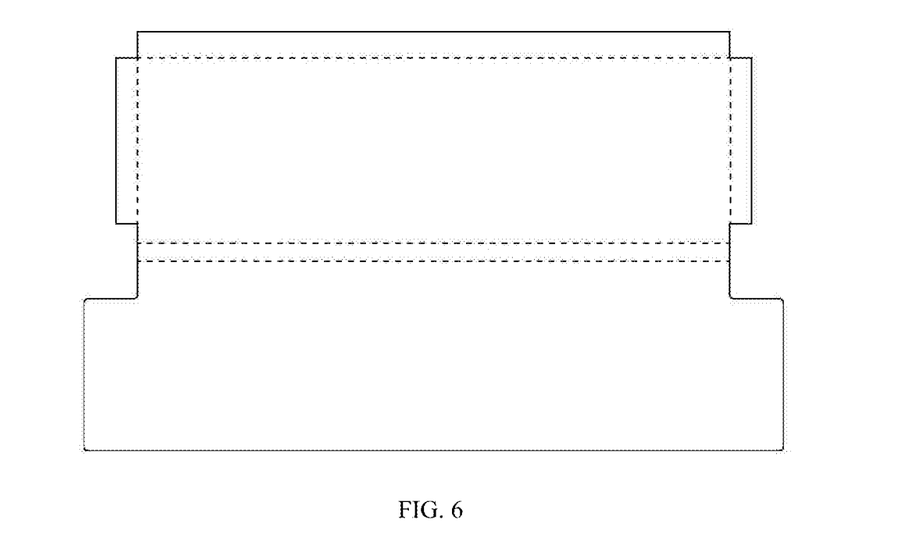
FIG. 6 is a schematic view of the side plate shown in FIG. 5 before being integrally bent and formed.

The side plate 3 of the present disclosure may be formed in various manners. In an example, as shown in FIG. 6, the side plate 3 is an integrally formed structure. That is, the side plate 3 may be bent and formed by a metal plate. It shall be understood that, the various abovementioned side plates can be bent and formed by a metal plate of different shape (which is not limited to that in FIG. 6), and is integrally formed.

Figure 4:
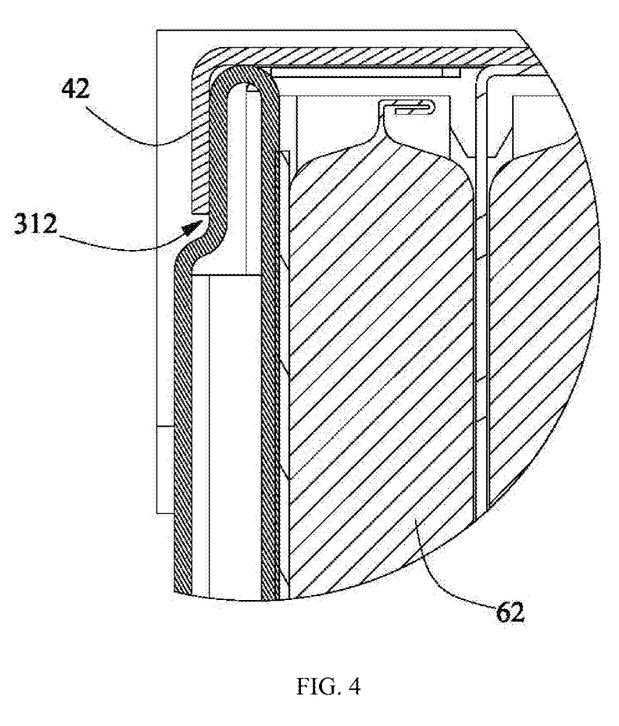
FIG. 4 is a partial zoomed-in view of FIG. 3.

As described in the above, the first plate 31 has a step-shaped segment 312 at least at one side in the height direction H, and the step-shaped segment 312 is concaved into the cavity 34 in the width direction W. In some embodiments, the first plate 31 has two step-shaped segments 312 formed at two sides in the height direction H respectively. Both the first side plate 1 and the second side plate 2 use the side plate 3 for assembling. Correspondingly, the top plate 4 includes: a body portion 41 and two top plate sides 42; the two top plate sides 42 are respectively connected to two sides of the body portion 41 in the width direction W. As shown in FIG. 1, each of the top plate side 42 overlaps the step-shaped segment 312 on a side of a corresponding side plate 3 in the height direction H. The bottom plate 5 includes: a body portion 51 and two bottom plate sides 52; the two bottom plate sides 52 are respectively connected to two sides of the body portion 51 in the width direction W. As shown in FIG. 3, each of the bottom plate sides 52 overlaps the step-shaped segment 312 on the other side of the corresponding side plate 3 in the height direction H. The top plate side 42 and the bottom plate side 52 may be welded and secured to the step-shaped segment 312 of the side plate 3, or may be secured in other manners like riveting. The configuration of the step-shaped segment 312 provides an accommodating space for the top plate sides 42 and the bottom plate sides 52, and improves energy density of the battery module. Further, with reference to FIG. 3 and FIG. 4, when the top plate sides 42 and the bottom plate sides 52 are being welded with the side plate 3, the hollow cavity 34 may insulate high temperature caused by welding, so that heat fails to be transferred to the inner battery units 6, thereby avoiding burning a pouch-type secondary cell 62 and improving safety of the battery module. If riveting is applied for securing, the hollow cavity 34 may further provide a sufficient assembling space for a rivet. Certainly, the first plate 31 may not have a step-shaped segment 312 formed at a side of the first plate 31, the side facing the top plate 4 in the height direction H. In this case, the top plate 4 may not have a top plate side 42, but it is only necessary to have an edge of the body portion 41 of the top plate 4 welded with the connection portion 33 of the first plate 31. Certainly, the top plate 4 may have the top plate sides 42, and in this case, it is only necessary to weld the top plate side 42 to a position corresponding to the first plate 31 in the height direction H. Similarly, if no step-shaped segment 312 is formed at a side of the first plate 31 in the height direction H, the side facing the bottom plate 5, the structural principle of design of the bottom plate 5 is identical with that of the top plate 4 and thus is not repeated.

Besides, during assembling, thermal adhesive is coated on a side of the body portion 51 of the bottom plate, and the side of the body portion 51 faces a plurality of battery units 6, so as to avoid insufficient contact between the plurality of battery units 6 and the bottom plate 5 caused by a planeness problem, thereby improving heat-dissipation efficiency of the battery module.

The plurality of battery units 6 are accommodated in the accommodating space and sandwiched between the first side plate 1 and the second side plate 2 in the width direction W of the first side plate 1 and/or the second side plate 2. At least one of the first side plate 1 and the second side plate 2 uses the above-described side plate 3. In some embodiments, both the first side plate 1 and the second side plate 2 use the side plates 3. The second plate 32 of the side plate 3 faces the accommodating space.

In a battery module of the present disclosure, the first side plate 1, the second side plate 2, the top plate 4 and the bottom plate 5 are assembled to form an outer frame, which prevents the battery units 6 from being scratched during assembling, as compared with an integral outer frame in the existing technologies. Besides, both the first side plate 1 and the second side plate 2 may be of a design of the side plate 3. When the battery unit 6 swells and deforms, the cavity 34 may provide an accommodating space for the battery unit 6 to swell in, which thus reduces accumulation of a swelling force and reduces swelling and deformation of the battery module. Besides, after the battery cell 6 swells, a swelling force is transferred to the first plate 31 of the side plate 3, then the first plate 32 transfers the swelling force to the welding position, so that a bending moment to the side plate 3 is transformed to be a pulling force against the top plate 4 and the bottom plate 5, and the strength of the welding position is greater than the strength in the middle of the side plate 3, thereby reducing deformation of the battery module.

Each battery unit 6 includes: a holder 61, and a pouch-type secondary cell 62 secured to the holder 61. There may be one, two or a plurality of pouch-type secondary cells 62.

Specifically, the pouch-type secondary cell 62 includes an electrode component (not shown), a packaging film (not shown) for packaging the electrode component in the packaging film, and electrode terminals 621 with opposite polarity and electrically connected to the electrode component and protruding from the encapsulating film. The packaging film may further package electrolyte (not shown). The electrode component includes electrode plates (not shown) with opposite polarity and a separator (not shown). An electrode plate includes a current collector and an active material layer provided on the current collector. The electrode component may be formed in a winding or laminating manner. The packaging film is manufactured by laminating sheets including polymer layers and metal layers. The metal layer may be of copper, aluminum or steel. When aluminum is applied, the packaging film may be named as an Al-plastic film. In the drawings, electrode terminals 621 respectively protrude from two sides in the length direction L, but it is certain that electrode terminals 621 with opposite polarity may protrude from the same side in the length direction L.

The battery module further includes a conductive connecting pad 7 and an elastic cushion 8. The conductive connecting pad 7 is electrically connected to the electrode terminals 621 so as to electrically connect (in series or in parallel) the plurality of battery units 6, thereby realizing charge and discharge of the battery module.

The elastic cushion 8 is sandwiched between an outermost battery unit 6 and a corresponding side plate 3, and/or between two neighboring battery units 6 in the width direction W. The elastic cushion 8 may provide a battery unit 6 with a swelling space in a case that a battery unit 6 swells, thereby further reducing swelling and deformation of the battery module.

The forgoing details describe a plurality of exemplary embodiments, but the present text does not intend to impose a limitation to the clearly disclosed combinations. Therefore, the features disclosed herein may be combined to form a plurality of other combinations not shown herein for the purpose of being concise, unless described otherwise.

What is claimed is:

1. A side plate, configured for a battery module and configured in a form of a hollow cavity, comprising:
    a first plate, comprising a first free end at a first side of the side plate in a height direction (H);
    a second plate, facing opposite to the first plate in a width direction (W), wherein the second plate comprises a second free end at the first side of the side plate in the height direction (H), and the first free end and the second free end abut against each other; and
    a connection portion, located at a second side of the side plate, the second side being opposite to the first side in the height direction (H), wherein the connection portion is configured to connect the first plate with the second plate, and wherein the connection portion, the first plate and the second plate of the side plate are configured to form an enclosed box-like structure, and the enclosed box-like structure encloses the hollow cavity; and
    wherein:
        the side plate is an integrally formed structure and a size of the side plate in the width direction (W) is smaller than a size of the side plate in the height direction (H);
        the first plate, the second plate, and the connection portion are configured to be arranged as a whole at one side of the battery module in the width direction (W); and
        the second plate is configured to separate the hollow cavity from battery units of the battery module.

2. The side plate according to claim 1, wherein the first plate and the second plate are configured to overlap and abut against each other at the first free end and the second free end respectively.

3. The side plate according to claim 2, wherein the first plate has a first curved segment formed at the first free end, and the first curved segment is configured to bend inwards and extend into the cavity, and overlap an inner surface of the second plate at the second free end; or
    the second plate has a second curved segment formed at the second free end, and the second curved segment is configured to bend inwards and extend into the cavity, and overlap an inner surface of the first plate at the first free end.

4. The side plate according to claim 2, wherein
the first plate has a first curved segment formed at the first free end, and the first curved segment is configured to bend inwards and extend into the cavity;
the second plate has a second curved segment formed at the second free end, and the second curved segment is configured to bend inward and extend into the cavity;
a side surface of the first curved segment in the width direction (W) is configured to overlap a side surface of the second curved segment in the width direction (W).

5. The side plate according to claim 1, wherein the first plate and the second plate are configured to butt and abut against each other at the first free end and the second free end respectively.

6. The side plate according to claim 5, wherein
the first plate has a first curved segment formed at the first free end, the first curved segment is configured to bend and extend towards the second plate in the width direction (W), and an end edge of the first curved segment is configured to abut against the second plate at the second free end; or
the second plate has a second curved segment formed at the second free end, the second curved segment is configured to bend and extend towards the first plate in the width direction (W), and an end edge of the second curved segment is configured to abut against the first plate at the first free end.

7. The side plate according to claim 5, wherein
the first plate has a first curved segment formed at the first free end, and the first curved segment is configured to bend towards the second plate in the width direction (W);
the second plate has a second curved segment formed at the second free end, and the second curved segment is configured to bend towards the first plate in the width direction (W);
an end edge of the first curved segment and an end edge of the second curved segment are configured to butt and abut against each other.

8. The side plate according to claim 1, wherein the side plate further comprises a side support;
wherein the side support is connected to at least one side of the second plate in a length direction (L) and configured to bend inwards and extend into the cavity, such that a side surface of the side support in the width direction (W) abuts against an inner surface of the first plate.

9. The side plate according to claim 1, wherein the first plate has a step-shaped segment concaved into the cavity in the width direction (W) at least at one side in the height direction (H).

10. The side plate according to claim 1, wherein the side plate further comprises:
two extension portions, connecting to two ends of the first plate in a length direction (L) and extending outwards in the length direction (L) respectively.

11. A battery module, comprising:
a first side plate;
a second side plate, disposed opposite to the first side plate in a width direction (W);
a top plate and a bottom plate, wherein the top plate is secured to the first side plate and the second side plate at one side in a height direction (H); the bottom plate is secured to the first side plate and the second side plate at the other side in the height direction (H); the top plate, the bottom plate, the first side plate and the second side plate are configured to enclose an accommodating space;
a plurality of battery units, accommodated in the accommodating space and sandwiched between the first side plate and the second side plate in the width direction (W);
wherein one side plate of the first side plate and the second side plate is configured in a form of a hollow cavity and comprises:
a first plate, comprising a first free end at a first side of the one side plate in the height direction (H);
a second plate, facing opposite to the first plate in the width direction (W), wherein the second plate comprises a second free end at the first side of the one side plate in the height direction (H), and the first free end and the second free end abut against each other; and
a connection portion, located at a second side of the one side plate, the second side being opposite to the first side in the height direction (H), wherein the connection portion is configured to connect the first plate with the second plate, and wherein the connection portion, the first plate and the second plate of the one side plate are configured to form an enclosed box-like structure, and the enclosed box-like structure encloses the hollow cavity;
wherein:
the first plate, the second plate, and the connection portion of the one side plate are arranged as a whole at one side of the battery module in the width direction (W);
the hollow cavity of the one side plate is separated from the accommodating space and the plurality of battery units in the accommodating space by the second plate of the one side plate; and
the one side plate is an integrally formed structure and a size of the one side plate in the width direction (W) is smaller than a size of the one side plate in the height direction (H).

12. The battery module according to claim 11, wherein the first plate and the second plate are configured to overlap and abut against each other at the first free end and the second free end respectively.

13. The battery module according to claim 11, wherein the first plate and the second plate are configured to butt and abut against each other at the first free end and the second free end respectively.

14. The battery module according to claim 11, wherein the one side plate further comprises a side support;
wherein the side support is connected to at least one side of the second plate in a length direction (L) and configured to bend inwards and extend into the cavity, such that a side surface of the side support in the width direction (W) abuts against an inner surface of the first plate.

15. The battery module according to claim 11, wherein the first plate has a step-shaped segment concaved into the cavity in the width direction (W) at least at one side in the height direction (H).

16. The battery module according to claim 11, wherein the one side plate further comprises:
two extension portions, connecting to two ends of the first plate in a length direction (L) and extending outwards in the length direction (L) respectively.

17. The side plate according to claim 1, wherein the side plate is configured for a battery module comprising a plurality of battery units; the side plate is configured as at least a side plate of the battery module, the plurality of battery units are accommodated in accommodating space of the battery module, and the second plate of the side plate is configured to face the accommodating space.

* * * * *